United States Patent [19]

Kovach et al.

[11] Patent Number: 5,660,384
[45] Date of Patent: Aug. 26, 1997

[54] IMAGING UNIT CONTAINER HAVING SHIFTABLE WALLS

[75] Inventors: Melinda K. Kovach, Woodbury; Gerald L. Metcalf, Burnsville; Stuart J. Wyman, St. Paul; Kenneth J. Hagen, Woodbury; Norman Herauf, Roseville, all of Minn.

[73] Assignee: Minnesota Mining and Manufacturing Company, St. Paul, Minn.

[21] Appl. No.: 344,462

[22] Filed: Nov. 23, 1994

[51] Int. Cl.⁶ ................................................. B65H 1/00
[52] U.S. Cl. .......................... 271/145; 271/162; 271/167
[58] Field of Search ................................ 271/145, 162, 271/164, 167; 378/182, 184, 188, 173; 354/319, 312

[56] References Cited

U.S. PATENT DOCUMENTS

| | | |
|---|---|---|
| 3,871,641 | 3/1975 | Marx et al. ................ 271/167 X |
| 3,926,428 | 12/1975 | Heldenbrand et al. . |
| 4,635,922 | 1/1987 | Roetter et al. ............. 271/121 X |
| 4,853,724 | 8/1989 | Tajima et al. . |
| 4,860,042 | 8/1989 | Tajima et al. . |
| 5,051,775 | 9/1991 | Yamakoshi et al. . |
| 5,055,869 | 10/1991 | DiPietro . |
| 5,091,281 | 2/1992 | Nakamura et al. . |
| 5,127,646 | 7/1992 | Matsuda et al. . |
| 5,149,078 | 9/1992 | Matsuda et al. . |
| 5,169,137 | 12/1992 | Matsuda et al. . |
| 5,228,678 | 7/1993 | Matsuda et al. . |

FOREIGN PATENT DOCUMENTS

| | | |
|---|---|---|
| 0 215 427 A2 | 3/1987 | European Pat. Off. . |
| 0 415 425 A2 | 3/1991 | European Pat. Off. . |
| 60-102338 | 6/1985 | Japan . |
| 62-70120 | 3/1987 | Japan . |
| 62-79128 | 4/1987 | Japan ..................... 271/167 |
| 63-247226 | 10/1988 | Japan . |
| 3-13437 | 1/1991 | Japan ..................... 271/121 |
| 4-7222 | 1/1992 | Japan ..................... 271/145 |
| 4-313521 | 11/1992 | Japan . |

OTHER PUBLICATIONS

"Package for sheet material," *Research Disclosure*, May 1983, No. 229, Havant Hampshire, Great Britain, pp. 192–194.

*Primary Examiner*—David H. Bollinger
*Attorney, Agent, or Firm*—William K. Weimer

[57] ABSTRACT

A container and a method of using the container for storing sheets of material, such as photosensitive materials, enables individual sheets to be transported from the container to an imaging unit by a feed mechanism of the imaging unit. The container fits within the imaging unit to provide a light-tight environment for the photosensitive material. The container includes shiftable walls, including a front ramp which can have a serrated surface to separate sheets. The container also includes a clamping components to allow for the removal of a light-tight bag which encloses the sheets.

23 Claims, 8 Drawing Sheets

IMAGING UNIT CONTAINER HAVING SHIFTABLE WALLS

FIELD OF THE INVENTION

The present invention is directed generally to apparatus for handling photosensitive media. In particular, the present invention is directed to an imaging unit container in which photosensitive sheets are stored and are individually extractable and feedable to a film exposure station of the imaging unit.

BACKGROUND OF THE INVENTION

Professional imaging systems, such as those employed for medical diagnostic (radiological) applications, have historically captured and recorded images on relatively large sized sheets of photosensitive material, using large volume wet development equipment. With the recent enactment and more rigid enforcement of environmental regulations that require safeguards against exposure to and proper disposal of chemicals used in image development equipment, image processing providers have begun the replacement of these cumbersome and expensive wet-development systems with dry silver processes. For example, in a typical dry silver imaging application for medical diagnostic applications, such as a sonogram or X-ray, the image of interest may be electro-optically captured on a 20.3 cm×25.4 cm (8"×10") sheet of dry silver photosensitive medium, so that the image size is large enough to be viewed and analyzed, is readily physically accommodated within the patient's file, and may be easily handled and stored by medical personnel without exposure to wet chemicals.

In the course of operation of a dry silver process-based imaging system, just as in the use of relatively small hand-held cameras, it is necessary to store the individual frames of the photosensitive media in a light-tight housing, while affording ready access to the frames as they are needed by the imaging equipment. In hand-held cameras, the film packaging is relatively compact, with the film being configured as either a continuous multi-frame roll housed in a light-tight cylindrical canister, or as individual sheets that may be housed in an auto-feed sealed cartridge that is disposable after all of the film sheets have been used. Unfortunately, due to their configuration and small size, neither of these hand-held camera film storage and feed approaches is capable of storing larger sheets of photosensitive material and interfacing such media with the sheet or web advance mechanisms employed by the larger, diagnostic imaging equipment.

Light-tight, single-use containers or packages for larger photosensitive materials used in, for example, medical diagnostic applications are generally known. As shown in U.S. Pat. No. 4,860,042, these light-tight containers can include a film bag or a tray covered by a lid. Also shown are carriages, or holders, which mate with the main body of a film loading device and removes the cover or the film bag while maintaining light-tightness. A roller within the main body is disclosed as being urged by a spring against the holder. Similarly, a light-shielding roller is displaced against a light-shielding plate of the holder by a resilient member. Rollers which are urged or biased together to provide light-tightness can create significant friction during removal of the lid or film bag making the removal difficult.

Containers for larger photosensitive materials have been designed to function with vacuum or suction feeding mechanisms within an imaging unit. This type of feeding mechanism, which lifts individual sheets of the photosensitive materials from the container and insert them into the imaging station of the imaging unit, requires a vacuum system as well as numerous parts for lifting and inserting the sheets. In addition, this type of feeding system can be susceptible to feeding multiple, rather than individual, sheets which are stuck or blocked together which can adversely affect the imaging process.

SUMMARY OF THE INVENTION

An embodiment of the present invention includes a container for storing sheets of photosensitive material and enabling individual sheets to be transported from the container to an imaging unit by a feed mechanism of the imaging unit. The container fits within an entry port of the imaging unit to provide a light-tight environment for the photosensitive material. The container includes a base upon which multiple sheets of photosensitive material may be placed. A front wall extends at an angle upwardly and outwardly from the base to facilitate sliding transport of each sheet from the container into the imaging station. The front wall is angularly shiftable relative to the base between first a position in which the front wall extends substantially perpendicular to the base and a second position in which the front ramp extends upwardly and outwardly from the base to form a front ramp.

Another embodiment includes a container for storing sheets of photosensitive material and enabling individual sheets to be transported from the container to an imaging unit by a feed mechanism of the imaging unit. The container fits within an entry port of the imaging unit to provide a light-tight environment for the photosensitive material. The container includes a base on which the light-tight bag containing the photosensitive material is placed. A clamping member is positioned and movable relative to the base. The clamping member is movable between an open position in which clearance between the clamping member and the base allows for insertion of the bag into the container and a closed position in which the clamping member and the base creates a light-tight clamp seal both while the bag is in the container and upon removal of the bag from the container. The clamping member includes at least one first stationary surface and the base includes at least one second stationary surface. The first stationary surface can create the light-tight clamp seal in conjunction with the second stationary surface.

Another embodiment includes a container for storing sheets of photosensitive material and enabling an individual sheet to be transported from the container to an imaging unit by a feed mechanism of the imaging unit. The container includes a base upon which multiple sheets of photosensitive material may be placed. A front ramp extends at an angle upwardly and outwardly from the base to facilitate sliding transport of the individual sheet from the container into the imaging station. The front ramp has a surface on which the individual sheet slides which minimizes the transporting of more than the individual sheet at one time.

Another embodiment includes a method for preparing a container for operation within an imaging unit, wherein the container includes a base and a front wall. The container contains sheets of material for the transfer of the sheets from the base of the container into the imaging unit. The method includes the step of shifting the front wall of the container between a first position in which the front wall extends substantially perpendicular to the base and a second position in which to the front wall extends upwardly and outwardly from the base and to form a front ramp which can guide the sheets when transferred into the imaging unit.

Another embodiment includes a method for providing a light-tight environment for photosensitive sheets enclosed within a light-tight bag after the light-tight bag is removed from the photosensitive sheets. The method includes the step placing the light-tight bag on a base of a container, wherein the container is insertable within an imaging unit. Another step includes clamping one end of the light-tight bag with a clamping member positioned and movable relative to the base. The clamping member is movable between an open position in which clearance between the clamping member and the base allows for insertion of the bag into the container and a closed position in which the clamping member and the base creates a light-tight clamp seal both while the bag is in the container and upon removal of the bag from the container. The clamping member includes at least one first stationary surface and the base includes at least one second stationary surface. The first stationary surface can create the light-tight clamp seal in conjunction with the second stationary surface. Another step includes inserting the container into the imaging unit. Another step includes removing the light-tight bag from between the first and second stationary surfaces which leaves the sheets of photosensitive material resting on the base of the container.

Another embodiment includes a method for minimizing the feeding of more than one sheet of material from a container. The method includes the step of advancing at least one sheet within the container so that at one sheet strikes a front ramp on the container. The front ramp has a surface which minimizes the transporting of more than the individual sheet at one time.

BRIEF DESCRIPTION OF THE DRAWINGS

The foregoing advantages, construction, and operation of the present invention will become more readily apparent from the following description and accompanying drawing in which.

DETAILED DESCRIPTION

Figure 1:
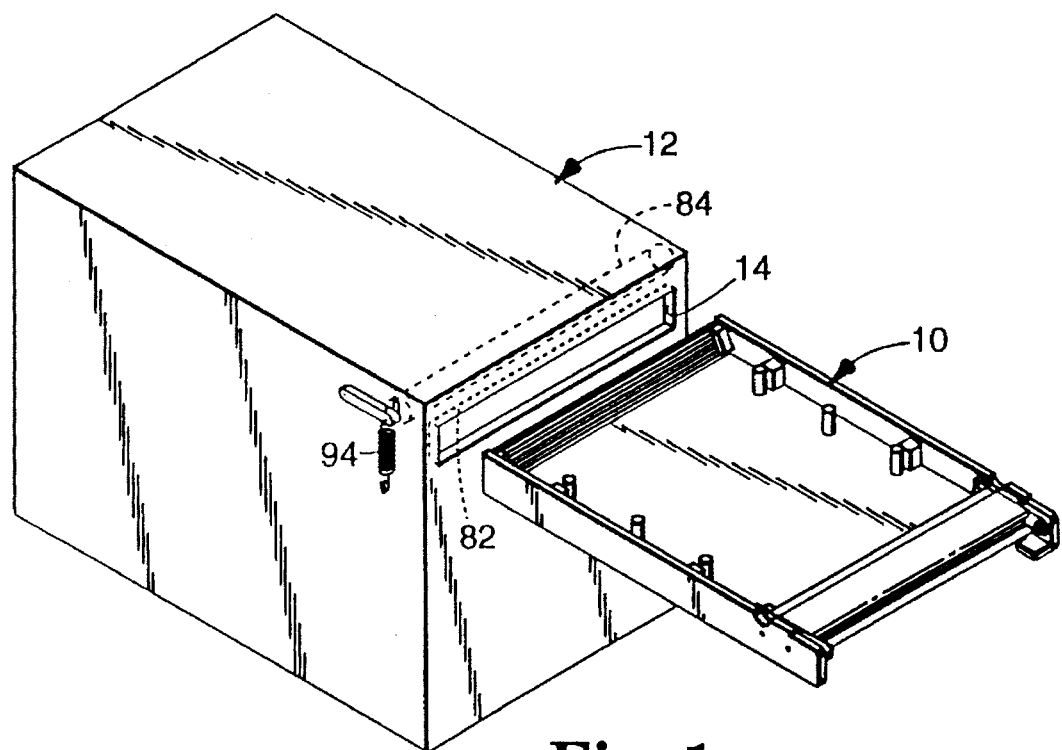
FIG. 1 is a perspective view of one embodiment of the container together with the imaging unit in which it fits.

The present invention is a container for storing multiple sheets of photosensitive material and enabling individual sheets to be fed to an imaging station of an imaging unit. The photosensitive material includes both photosensitive films and papers. One embodiment of the container is a carriage 10, a reusable component which mates with a feed station (not shown) of the imaging unit 12 by passing through an entry port 14, as shown in FIG. 1. The carriage 10 is shown being placed within the imaging unit 12 such that the carriage 10 is in a horizontal position even though it could be oriented differently within the imaging unit 12.

Figure 2:
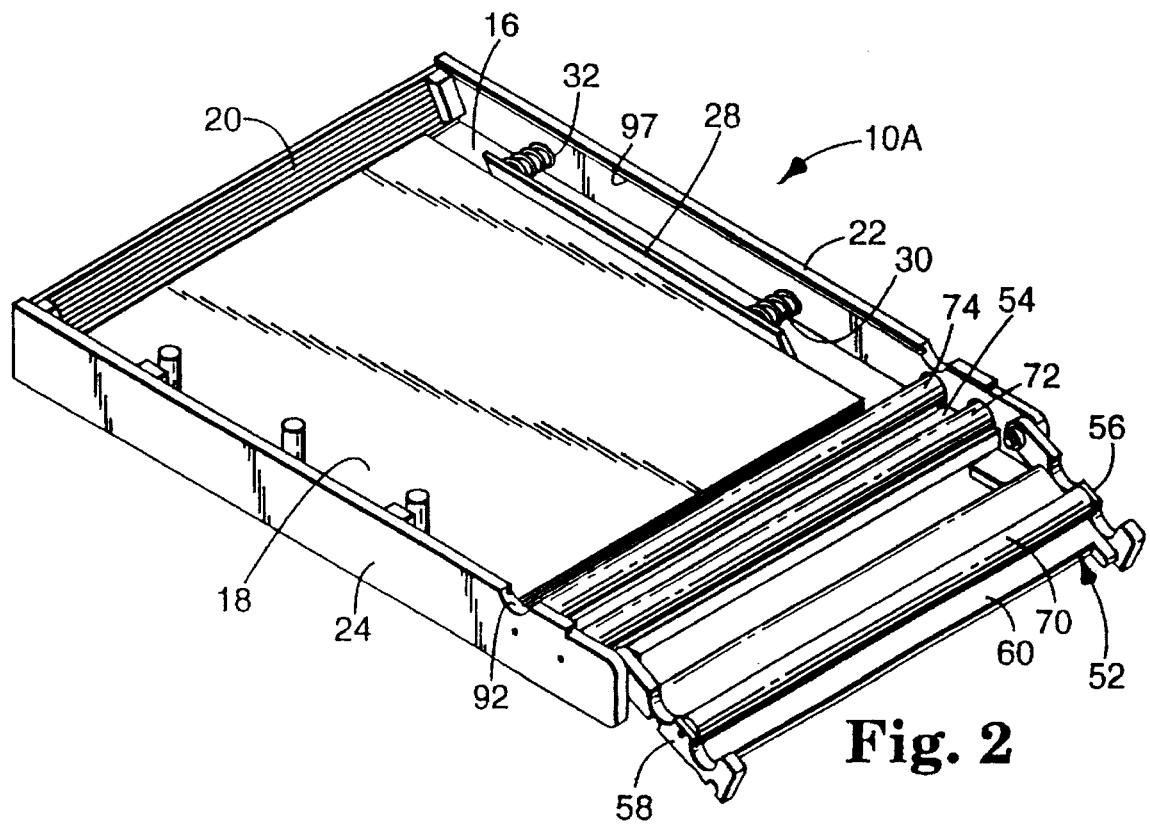
FIG. 2 is a perspective view of another embodiment of the container of FIG. 1.

As shown FIG. 2, the carriage 10A can include a base 16 upon which the sheets of photosensitive material 18 can be placed. The carriage 10 can also include a front ramp 20 which extends upwardly and outwardly from one end of the base 16. Optionally, this carriage 10A includes side walls 22, 24 which extend substantially upwardly from the base 16.

Figure 3:
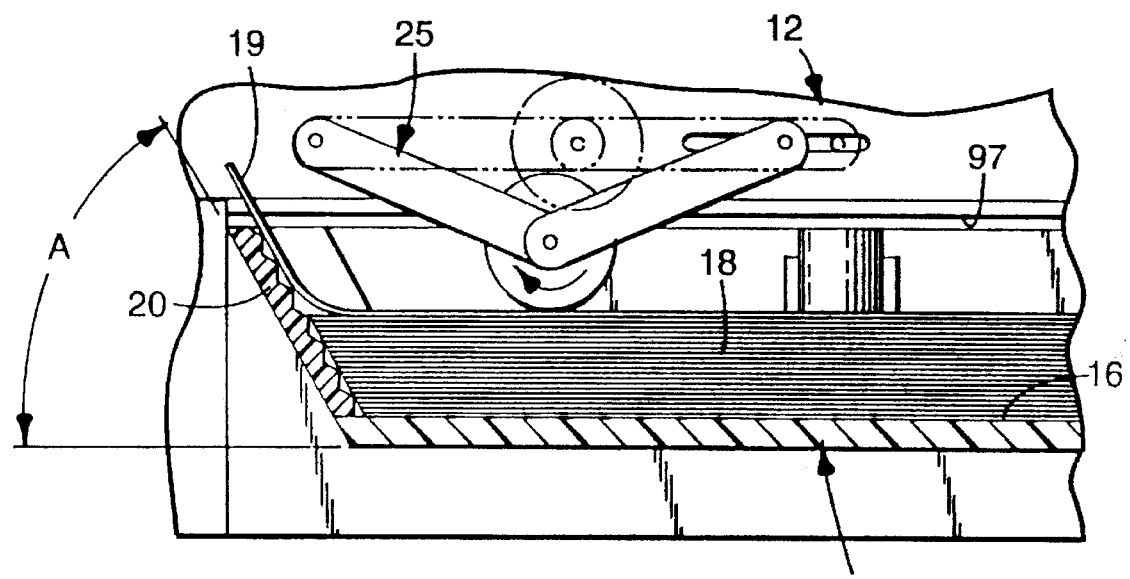
FIG. 3 is a cross-sectional side view of the container inserted within the imaging unit which includes a kick feed mechanism.

A kick feed mechanism 25 within the imaging unit 12 can frictionally slide the top sheet 19 from the carriage 10, as shown in FIG. 3, and feed it toward the imaging station. The front ramp 20 facilitates the sliding of the top sheet out of the container while being sufficiently vertical to hold the remaining sheets within the carriage 10. The angle A of the front ramp 20 need only be sufficient to guide the top sheet from the carriage 10A and into the imaging unit 12. For example, the angle A of between 30 and 85 degrees is sufficient, although other angles can suffice. More preferably, the angle A is approximately 60 degrees.

Figure 4:
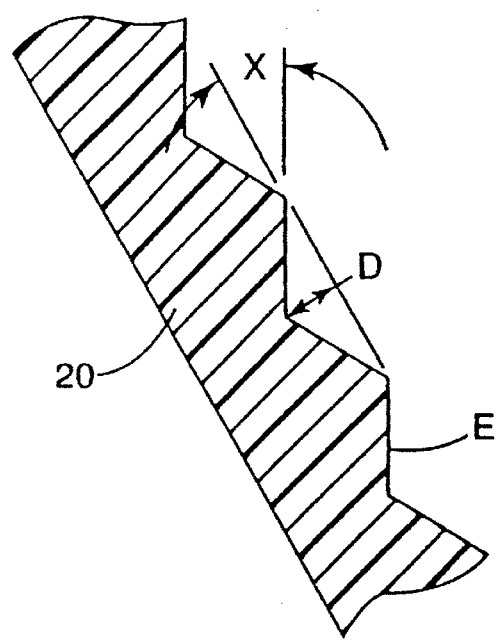
FIG. 4 is a enlarged, cross-sectional, partial side view of the front ramp shown in FIG. 3.

To prevent the kick feed mechanism 25 from feeding more than the top sheet 19, the front ramp 20 can have other than a smooth surface. As shown in FIGS. 1–4, the front ramp 20 can include serrated edges E which allows the top sheet 19 to exit from the carriage 10, but separate the top sheet 19 from the lower sheets and retain the lower sheets within the container. The angle X and depth D of the serrated edges E contribute to the aggressiveness of the separation, as does the angle of the front ramp 20, the portion P of the front ramp 20 which includes the serrated edges E, and the sheet material (e.g., polyester film). As shown in FIG. 4, the angle X preferably ranges from approximately 5 degrees to approximately 60 degrees. The depth D preferably ranges from approximately 0.05 mm to approximately 0.40 mm, and more preferably is approximately 0.13 mm. The portion P of the front ramp 20 which is serrated, as shown in FIG. 2, can be the entire front ramp 20, although one or more narrower portions can be serrated. For example, three 2.5 m-wide vertical portions can be spaced across the front ramp 20 to contact the edges and center of the sheets 18. For another example, a single 10 mm-wide vertical portion can be in the center of the front ramp 20 to contact only the center portion of the sheets 18.

Figure 5:
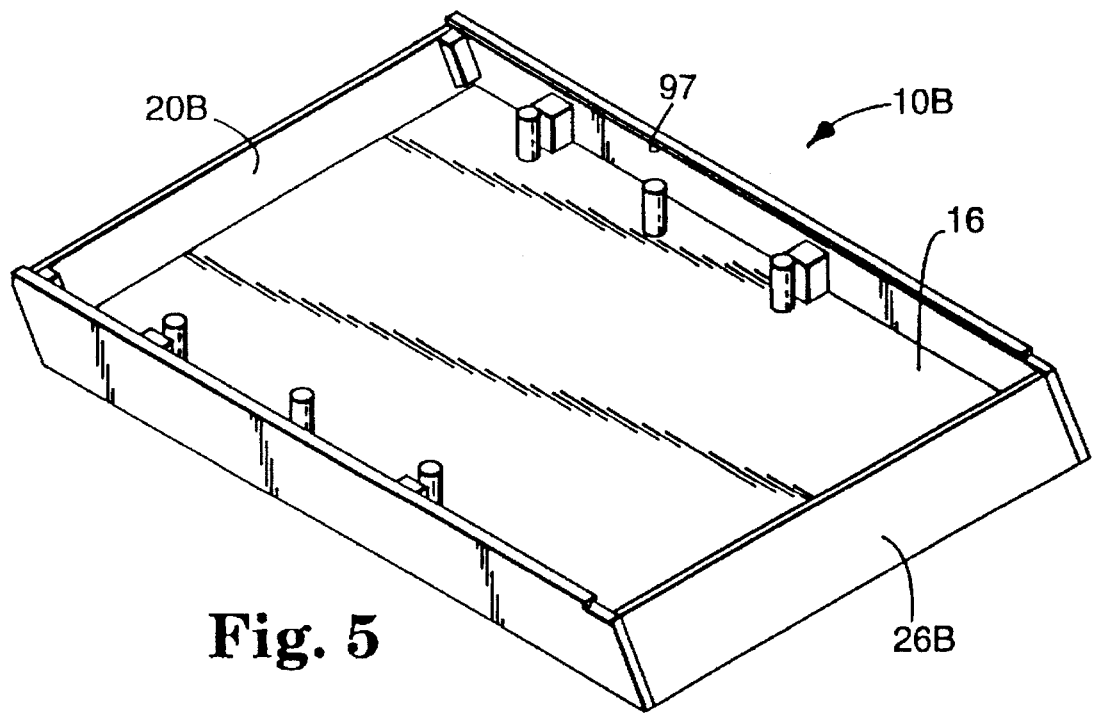
FIG. 5 is a perspective view of another embodiment of the container.

As shown in FIG. 5, the carriage 10B can include a back wall which can be angled to form a back ramp 26B substantially parallel to the front ramp 20B. The distance between the two ramps 20B, 26B can be selected to provide minimal clearance to reduce the movement and potential damage after the sheets 18 of photosensitive material are inserted into the carriage 10B. Damage can occur if the sheets 18 repeatedly slide against one another.

Figure 6:
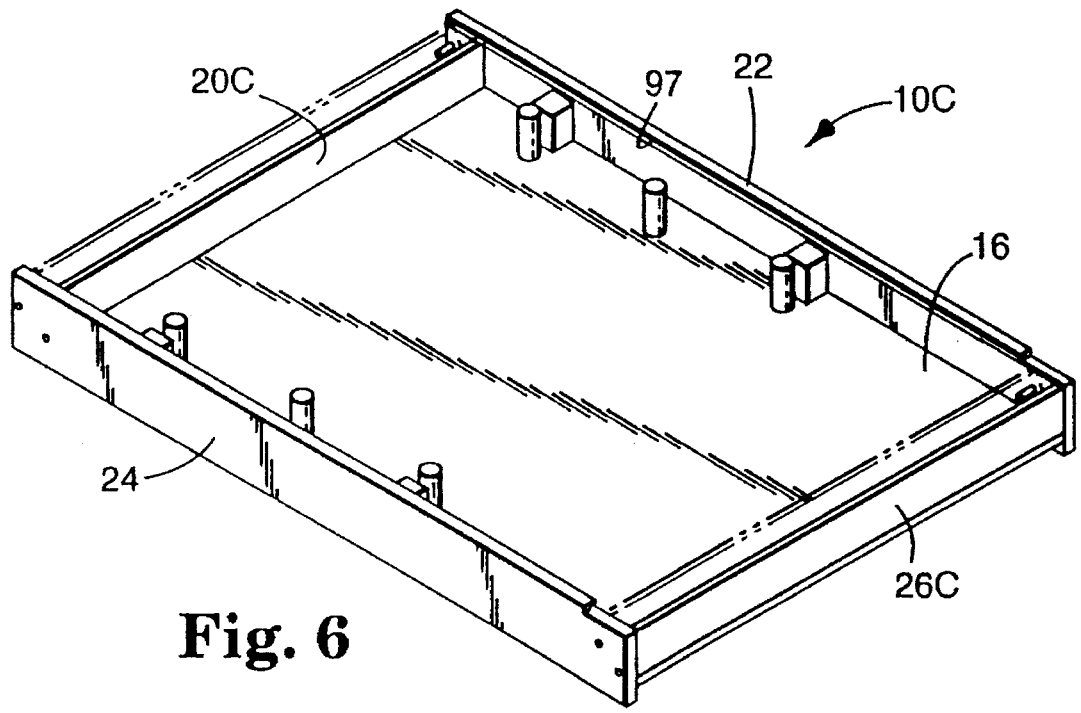
FIG. 6 is a perspective view of the container of FIG. 5 having shiftable front and back walls.

One or both of the ramps 20C, 26C can have the ability to shift from extending substantially vertically from the base 16, as shown on the cassette 10C in FIG. 6, to extending angularly from the base 16. The front ramp 20C can be shifted to form an obtuse angle with the base 16, and the back ramp 26C can be shifted to form an acute angle with the base 16 and remains substantially parallel with the front ramp 20C. This allows the ramps 20C, 26C to be shifted from a vertical storage position to an angled use position after insertion of the sheets 18. When the sheets 18 are inserted and fit snugly between the two ramps 20C, 26C when vertically positioned relative to the base 16, shifting both ramps 20C, 26C forces the sheets 18 to slide from their original rectangular shape to a parallelogram-like shape. Therefore, if individual adjacent sheets 18 are stuck together (blocked) when inserted, shifting them can separate (unblock) them. The ability to shift can be provided by pinning the base of the ramps 20C, 26C to the base of the side walls 22, 24.

The carriage 10A can also apply a force to the side of the sheets 18 to keep them positioned or registered correctly. As shown in FIG. 2, one side wall 22 of the carriage 10A includes a positioning bar 28 which contacts the sheets 18 by sliding on two posts 30 each of which includes a spring 32, or another biasing device. When the sheets 18 are not within the carriage 10A, the springs 32 are fully relaxed putting the positioning bar 28 in its most outward position from the side wall 22. When in this position, the distance between the positioning bar 28 and the opposite side wall 24 is slightly less than the width of the sheets 18. To insert the sheets 18, the positioning bar 28 must be slid toward the side wall 22 against the bias of the springs 32. Once inserted into the carriage 10A, the sheets 18 are forced to contact and align with the opposite side wall 24.

In place of the positioning bar 28, a piece of foam (not shown) can force the sheets 18 toward the opposite side wall 24. The foam can be encapsulated in a film, such as a 0.018 cm-thick polyester film, to protect the foam and prevent foam particles from becoming free within the container 10. Foam can provide a sufficient spring force to force a relatively large number of sheets 18 toward the opposite side wall 24, while not excessively large to deform or flex the sheets 18 when a relatively small number of sheets 18 are present within the container 10.

Figure 7:
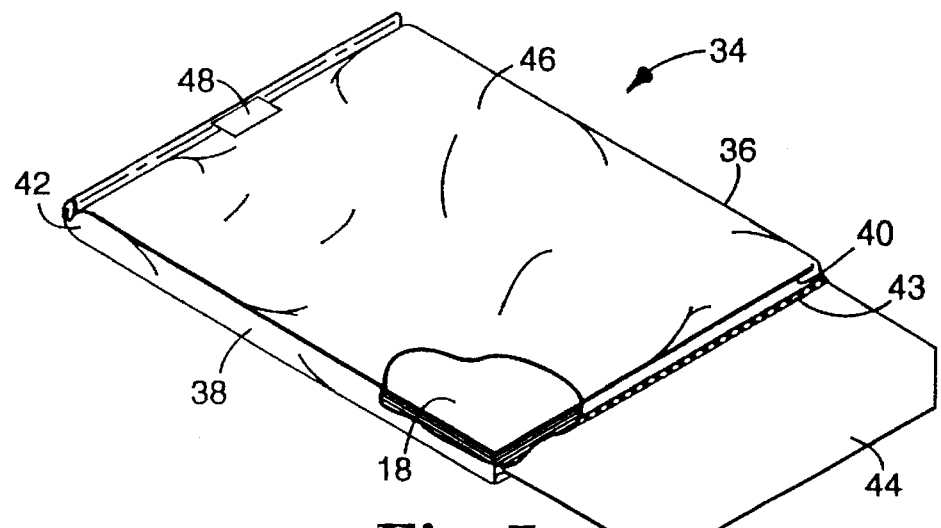
FIG. 7 is a perspective view of a light-tight bag.

The carriage 10 can be daylight loaded when used in conjunction with sheets 18, which are contained within a light-tight bag 34 shown in FIG. 7. The bag 34 can surround a carrier insert (not shown), such as a rectangular fiberboard tray, in which the film rests. The bag 34 shown in FIG. 7 has two sides 36, 38, a back end 40, and a front end 42. The seal 43 can be made thermally if the bag 34 is a thermoplastic. Sealing the bag 34 inward from the back end 40, creates a bag tab 44. The tab 44 can have a chevron shape.

The front end 42 of the bag 34 is not sealed, but is rolled back and adhered to the middle section 46 of the bag 34 to maintain the light-tight enclosure of the sheets 18. The front end 42 can be adhered with a piece of perforated tape 48 which is broken by a user just prior to inserting the carriage 10 into the imaging unit 12. Although the tape 48 no longer holds the bag closed, the film bag 34 remains folded and light-tight due to set the film bag 34 has taken in the folded position.

Figure 8:
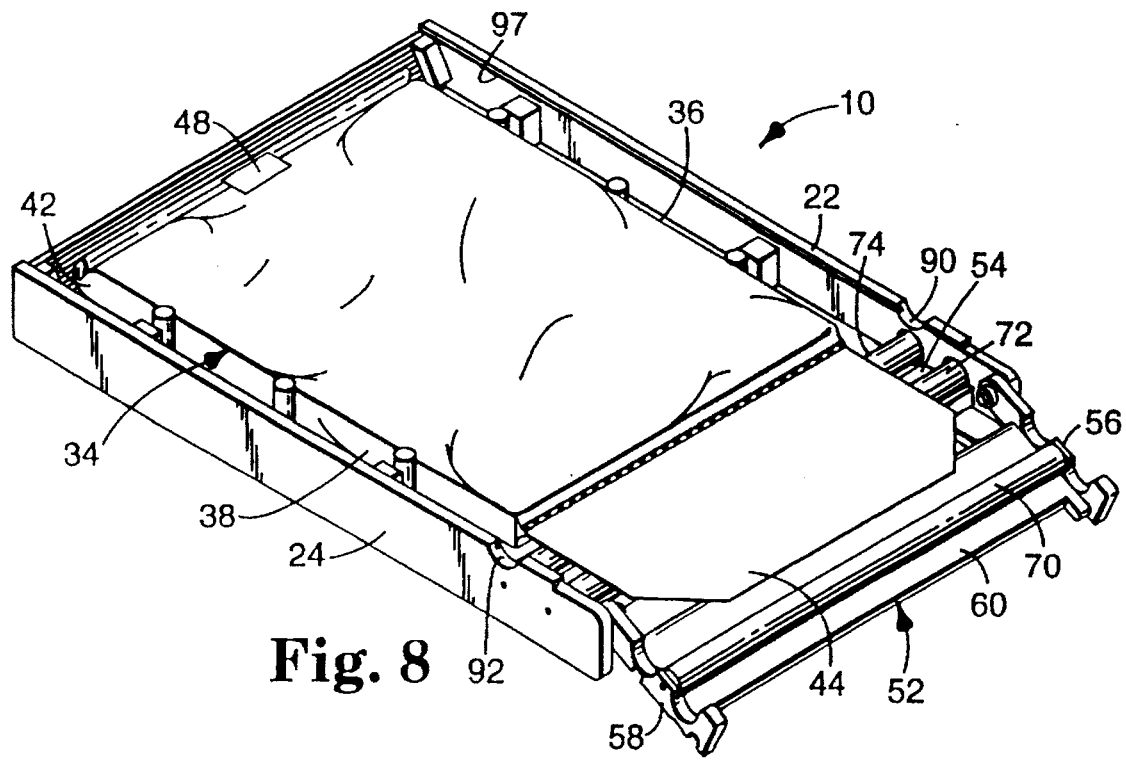
FIG. 8 is a perspective view of the bag of FIG. 7 within the container of FIG. 1.

To insert the bag 34 within the carriage 10, the carriage 10 is first removed from the imaging unit 12. Because the present invention allows the carriage 10 to be entirely removed from the imaging unit 12, a user can easily position the bag 34 within the carriage 10. The carriage 10 can clamp the back end 40 of the bag 34 before being reinserted into the imaging unit 12. Once inserted, the carriage 10, mated with the feed station of the imaging unit 12, creates a light-tight environment for the bag 34. One embodiment of the carriage 10 includes a clamping member 52 which holds the bag 34 against the back portion 54 of the carriage base 16, as shown in FIG. 8. The carriage 10 and the clamping member 52 can function with the previously mentioned kick feed system, as well as with known suction or vacuum-feed systems (not shown).

The clamping member 52 has a longitudinal axis and includes two side members 56, 58 each of which is hinged to the respective side wall 22, 24 of the carriage 10. The clamping member 52 also includes a cross member 60 which is substantially perpendicular to and connected to the side members. The clamping member 52 can be pivoted so that the cross member 60 is moved relative to the back portion 54 of the carriage base 16. The clamping member 52 pivots around an axis which is parallel to the longitudinal axis of the clamping member 52.

Figure 9:
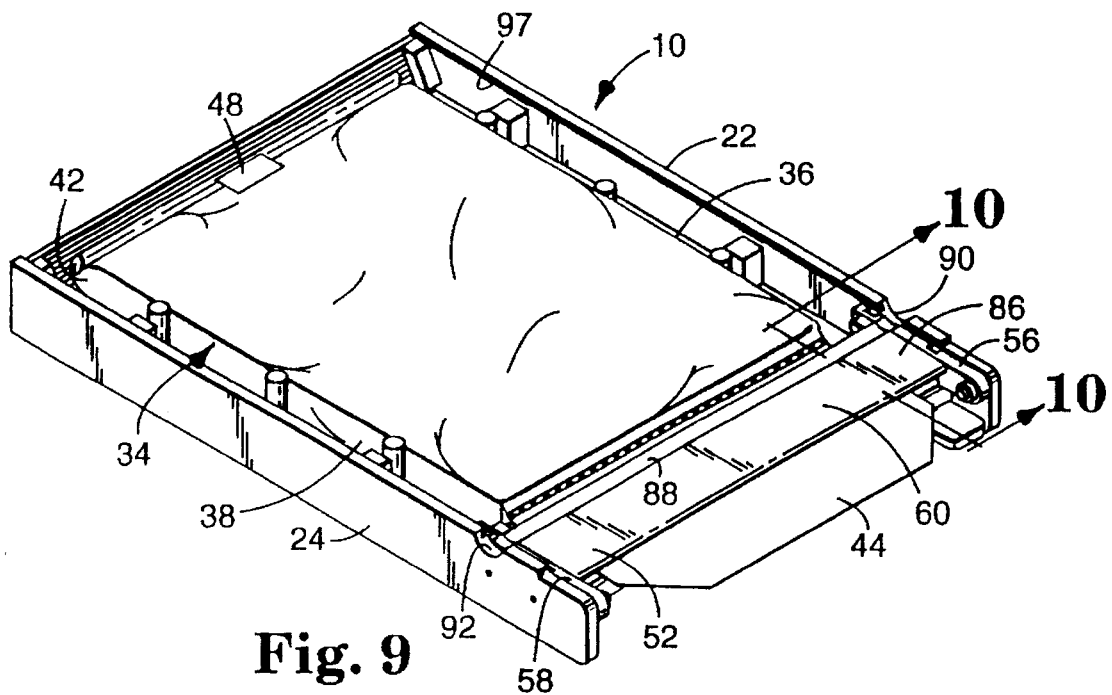
FIG. 9 is a perspective view of the bag and container of FIG. 8 wherein a clamping member has been pivoted to contact the bag.

As shown in FIG. 8, when the clamping member 52 is pivoted upwardly and away from the base 16 to an open position, the bag 34 can be placed on the base 16 with the tab 44 lying across the back portion 54 of the base 16. When the clamping member 52 is the open position, sufficient clearance exists between the clamping member 52 and the base 16 so that the tab 44 of the bag 34 can be inserted. When the clamping member 52 is moved downwardly and in close proximity to the base 16 to a closed position, as shown in FIG. 9, the clamping member 52 forces the tab 44 against the back portion 54 of the base 16. The tab 44 extends beyond the clamping member 52 and the base 16.

When the carriage 10 containing the bag 34 is inserted into the imaging unit 12, the user can grasp and pull the tab 44 of the bag 34. Pulling the tab 44 causes the front end 42 of the bag 16 to unfold and open. Pulling the tab 44 further slides the bag 34 from the carriage 10 leaving the sheets 18 ready for feeding to the imaging station.

Figure 10:
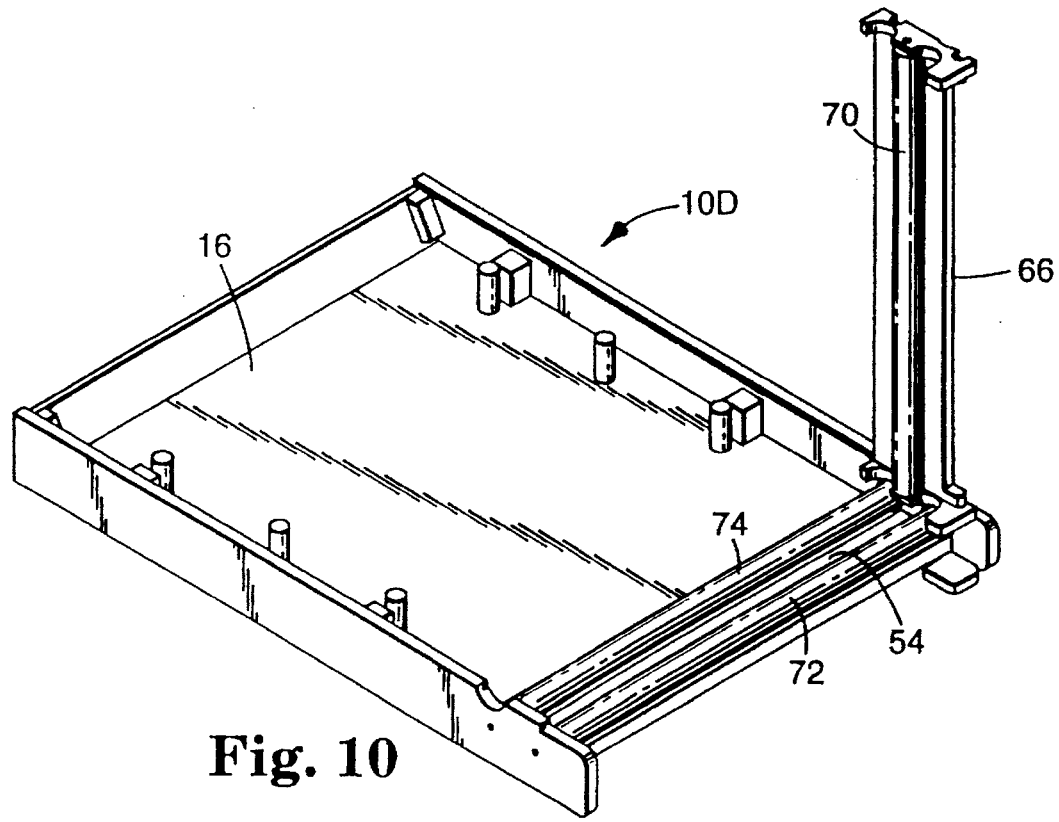
FIG. 10 is a perspective view of another embodiment of a clamping member.

In the alternative embodiment of FIG. 10, a swinging clamping member 66 having a free end 68 and a hinged end 69 which is attached to a side wall 22 of the carriage 10D. The swinging clamping member 66 can pivot at the hinged end 69 around an axis which is perpendicular to the longitudinal axis of the swinging clamping member 66. The swinging clamping member 66 can pivot away from the base 16 into an open position so that the bag can be placed onto the base 16, and can pivot toward the base 16 into a closed position where the swinging clamping member 66 forces the bag 34 toward the carriage base 16.

Figure 11:
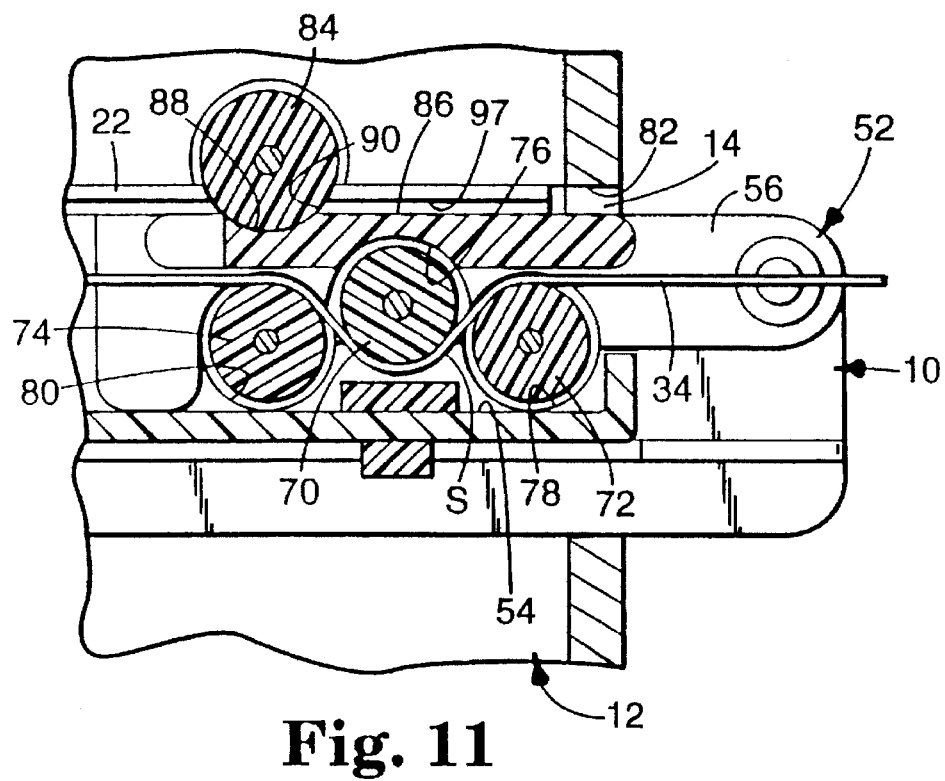
FIG. 11 is a side sectional view of the container inserted within the imaging unit.

As shown in FIGS. 8 and 11, the clamping member 52 (or the swinging clamping member 66 in FIG. 10) can include a clamping member roller 70 which extends across the clamping member 52. The clamping member roller 70 is located on one surface of the clamping member 52 so that the clamping member roller 70 contacts the bag 34 and permits a smooth removal of the bag 34.

To further facilitate a smooth removal and light-tightness, the carriage base 16 can include one or more base rollers. Two base rollers 72, 74, which extend across the back portion 54 of the base 16, are substantially parallel with the clamping member roller 70. Preferably, the carriage base 16 includes two base rollers 72, 74 which are located so the clamping member roller 70 falls between them when the clamping member 52 is pivoted against the carriage base 16.

When the clamping member 52 is closed, the two base rollers 72, 74 and the clamping member roller 70 create a curved or serpentine bag path S, as shown in FIG. 11. The bag path S prevents light from entering the path S through which the bag 34 passes when the bag 34 is removed.

The present invention is also light-tight below and above the clamping member roller 70 and the base rollers 72, 74. As shown in FIG. 11, the clamping member 52 includes a groove 76 in which the clamping member roller 70 resides to prevent light from passing between the clamping member 52 and the clamping member roller 70. Similarly, the base 16 of the carriage 10 has two grooves 78, 80 in which the base rollers 72, 74 reside to prevent light from passing between the base 16 of the carriage 10 and the base rollers 72, 74. These grooves and rollers create a light-tight back wall of the carriage 10 when inserted into the entry port 14.

The clamping member roller 70 and the base rollers 72, 74 need not be urged together for light-tightness, although they can be. When clearance exists between the three rollers as shown in FIG. 11, minimal friction is created against the bag 34 during removal. With minimal friction, a user can more easily remove the bag by grasping and pulling the bag tab 44.

In a related embodiment, the clamping member 52 could be fixed, rather than moveable, relative to the base 16. The clearance between the clamping member 52 and the base 16 must be sufficiently large to allow for insertion of the bag tab 44 between the clamping member 52 and the base 16. In addition, the clearance must be sufficiently small to maintain light-tightness when the bag 34 is removed from the carriage 10 by the user.

Figure 12:
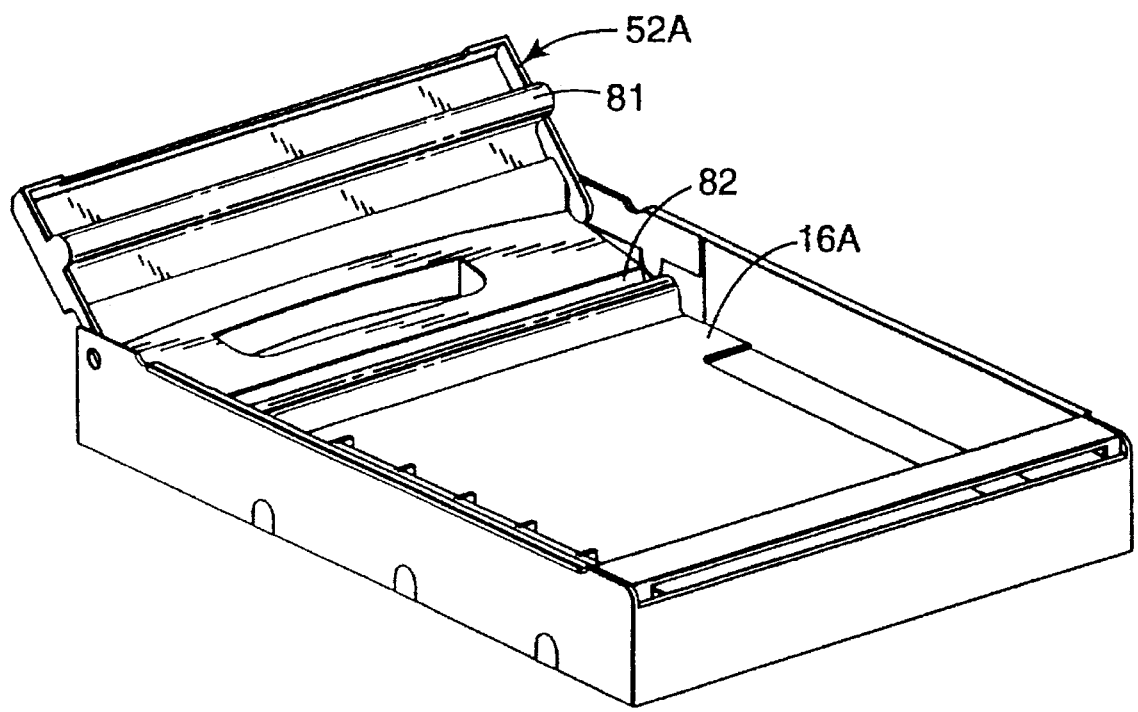
FIG. 12 is a perspective view of another embodiment of the container having another embodiment of the clamping member.
Figure 13:
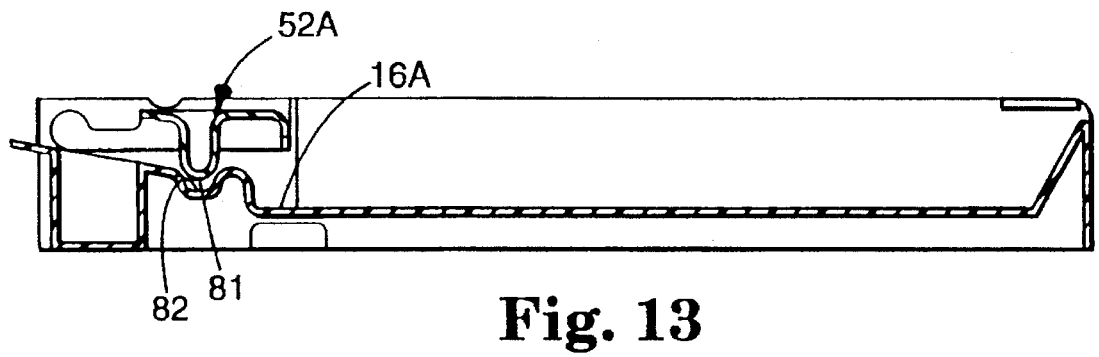
FIG. 13 is a side sectional view of the container and clamping member shown in FIG. 12.

In another related embodiment, the clamping member roller 70 can be replaced by a first stationary surface 81 and the base rollers 72, 74 can be replaced by a second stationary surface 82, as shown in FIGS. 12 and 13. Like the rollers 70, 72, 74, the first and second stationary surfaces 81, 82, when brought together, can provide light-tightness due to the tortuous serpentine path, or some other shaped path. Also like the rollers 70, 72, 74, the stationary surfaces 81, 82, when brought together about the bag 34, can include a clearance which allows for removal of the bag 34 with minimal friction.

Unlike the rollers 70, 72, 74, the first and second stationary surfaces 81, 82 are stationary. Preferably, the first stationary surface 81 is integral to the clamping member 52A and the second stationary surface is integral to the base 16A. This can be accomplished, for example, by injection-molding the clamping member 52A having the first stationary surface 81, and the base 16A having the second stationary surface 82.

The first stationary surface 81 is shown as a single raised and rounded surface fitting within the second stationary surface 82, which is shown as a single groove or trough. Instead, the first stationary surface 81 could be made as a groove or trough and the second stationary surface 82 could be made as a raised surface. In addition, instead of a single pair of stationary surfaces 81, 82, multiple stationary surfaces (not shown) could be used.

The choice of materials for forming the stationary surfaces 81, 82 can be important to allow for minimal friction between the bag and the first and second stationary surfaces 81, 82 during removal. Acetal resins (e.g., Delrin®) and ABS have been shown to work, as have an acetal resin impregnated with polyfluoroethylene (e.g., Delrin® with Teflon®).

Figure 14:
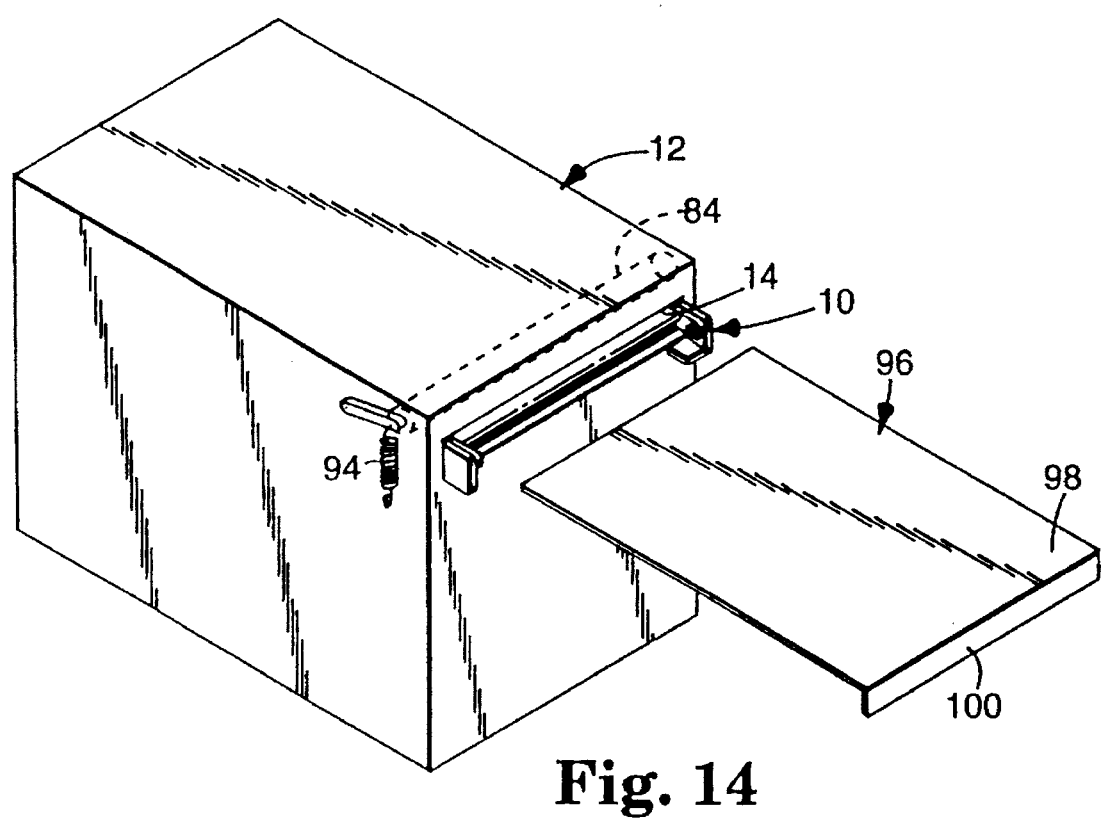
FIG. 14 is a perspective view of a lid positioned to be inserted into the container while within the imaging unit.

Light-tightness where the carriage 10 meets the upper surface 83 of the entry port 14 can be provided by an upper roller 84 as also shown in FIGS. 1 and 14. While the upper roller 84 could be attached to the carriage 10, the upper roller 84 is shown recessed within and extending across the upper surface 83 of the entry port 14 of the imaging unit 12. When the carriage 10 is inserted into the entry port 14, the upper roller 84 rolls over the top surface 86 of the clamping member 52 of the carriage 10 forming the light-tight seal.

For further light-tightness where the carriage 10 meets the upper surface 83 of the entry port 14, the clamping member 52 can include an upper roller groove 88 in which the upper roll 84 can fit. The position of the upper roller 84 in the upper roller groove 88 creates the light-tight seal.

Light is also prevented from entering the imaging unit 12 along the side walls 22, 24 of the carriage 10. The side walls 22, 24 of the carriage 10 extend up to and mate with the upper roller 84 of the imaging unit 12, shown in FIG. 11. Side walls 22, 24 include cut-aways 90, 92 which align with the upper roller groove 88 in the clamping member 52 and similarly mate with the upper roller 84.

To downwardly bias the upper roller 84 into the upper roller groove 88 and cutaways 90, 92 after the roller 84 rolls over the top surface 86 of the clamping member 52, a spring 94 can be attached to the imaging unit 12 as shown in FIGS. 1 and 14.

In addition, when the upper roller 84 is held down within the upper roller groove 88, horizontal movement of the upper roller 84 relative to the carriage 10 is reduced. Because the upper roller 84 should not move horizontally relative to the imaging unit 12, the upper roller 84 prevents horizontal movement of the carriage 10 relative to the imaging unit 12 when the upper roller 84 is within the upper roller groove 88. Preventing horizontal movement of the carriage 10 is important for effective feeding of the sheets 18 into the imaging station of the imaging unit 12.

In place of the upper roller 84 for light-tightness at this location, a different upper light-tight member could be used. A compliant member (not shown), such as a strip of felt or a plurality of brushes, could maintain intimate contact and light-tightness between the clamping member 52 and the upper surface 82 of the entry port 14. Similarly, another light-tight member (not shown) having a living hinge which could bias a portion of the light-tight member into a mating groove (not shown) on the top surface 86 of the clamping member 52 for light-tightness. Still another upper light-tight member (not shown) could be biased downwardly so that it would fit into a mating groove (not shown) in the carriage 10. The biasing could be accomplished by a living hinge connected to or a part of the light-tight member.

The carriage 10 can maintain light-tightness even when the imaging unit 12 is opened for servicing, such as for removing a misfed sheet of film. As shown in FIG. 14, a lid 96 can be slid into the carriage 10 to cover the sheets 18 within the carriage 10. The lid 96 is generally a thin, rectangular sheet of material, such as a metal or plastic.

Figure 15:
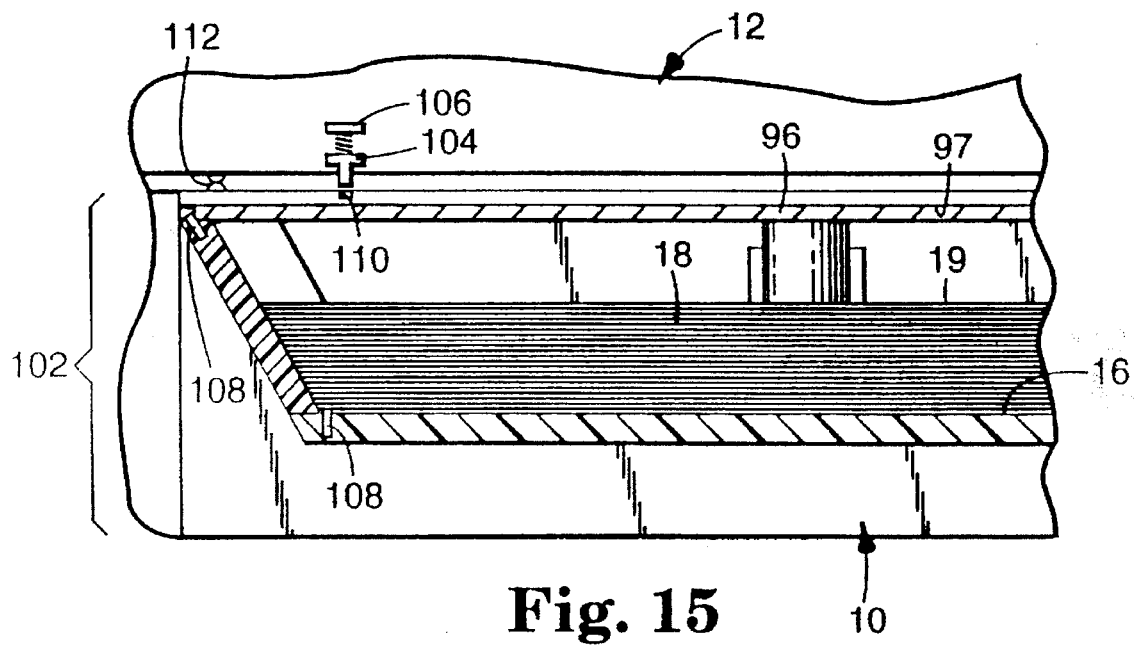
FIG. 15 is a cross-sectional view of a container-locking apparatus.

The lid 96 can be slid between the upper surface 86 of the clamping member 52 and the corresponding upper surface 83 of the entry port 14. The carriage 10 can include a lid slot 97 on each of the side walls 22, 24 to guide the lid 96 over the sheets of photosensitive material 18, as shown in FIG. 15. To slide into position, the lid 96 must contact the upper roller 84 and force the roller 84 out of the groove 88 in the clamping member 52. However, because the downwardly biased upper roller 84 will either roll or slide against the lid 96 as the lid 96 slides through, the light-tightness is maintained. As shown, the trailing end 98 of the lid 96 can include a lip 100 which is generally perpendicular to the remainder of the lid 96. The lip 100 can be grasped and pulled to remove the lid 96 once within in the imaging unit 12, and also provides further light-tightness for the carriage 10.

For improved light-tight security, the present invention can include a film-saver apparatus 102, as shown in FIG. 15. The embodiment of the film-saver apparatus 102 shown in FIG. 15 can prevent the removal of the carriage 10 when the carriage 10 contains one or more sheets of photosensitive materials 18. However, the film-saver apparatus 102 can allow removal of the carriage 10 when the carriage contains one or more sheets 18 if the lid 96 is in place.

Within the imaging unit 12, the apparatus 102 includes a locking member 104, and a locking solenoid 106. Within the carriage, the apparatus 102 includes a locking sensor 108 and a locking hole 110. The locking sensor 108 can sense both the presence of one or more sheets of photosensitive materials 18 and the engagement of the lid 96 with the carriage 10.

One embodiment of the sensor 108 could be a simple switch activated by the weight of the sheets 18 and the position of the lid 96. The sensor 108 can be connected to the solenoid 108 by an electrical contact 112 between the carriage 10 and the imaging unit 12. If the sensor 108 senses the presence of one or more sheets 18, but not the engagement of the lid 96, the sensor 108 signals the locking solenoid 106 to insert the locking member 104 into the locking hole 110, thereby preventing removal of the carriage 10 from the imaging unit 12. However, if the sensor 108 senses no sheets 18 or the engagement of the lid 96, the sensor 108 signals the solenoid 106 to remove the locking member 104 from the hole 110, thereby allowing the removal of the carriage 10. These locking and sensing components could be oriented differently within the carriage 10 and the imaging unit 12.

Figure 16:
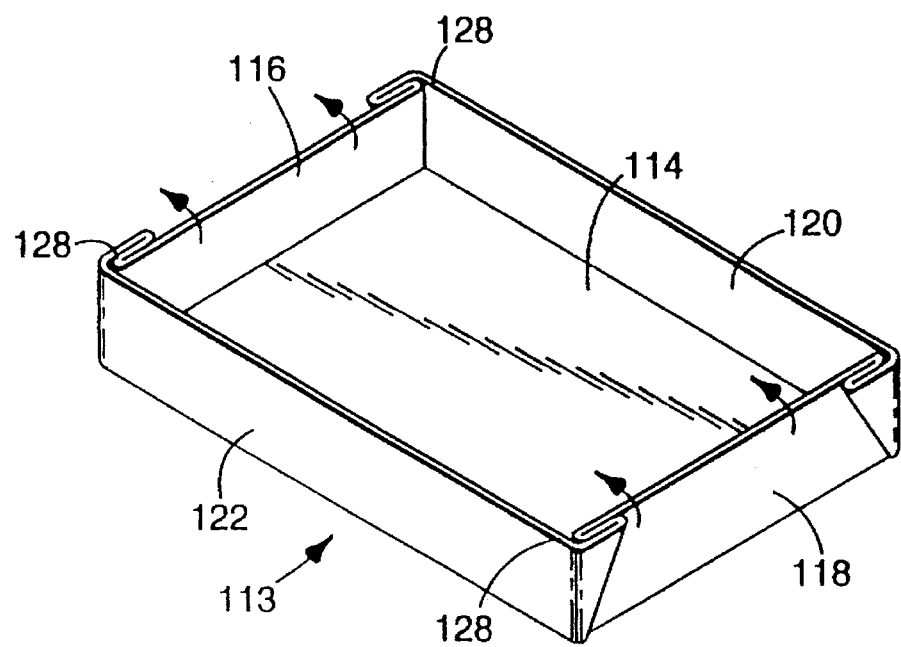
FIG. 16 is another embodiment of the container.

Another embodiment of the container is a cassette 113, rather than a carriage 10, as shown in FIG. 16. Unlike the carriage 10, the cassette 113 is a single-use, light-tight container which is used to store the sheets 18 of photosensitive material from the sheet manufacturer and can replace the light-tight bag 34. Like the light-tight bag 34, the cassette 113 can be placed into a imaging unit carriage to deliver the sheets 18. The cassette 113 can be made of fiberboard, plastic, metal, or the like.

The cassette 113 can be generally rectangular and include a base 114, front wall 116, back wall 118, and two side walls 120, 122. The front wall 116, the back wall 118, or both could be fixed at some angle relative to the base 118 to form a front ramp 124, a back ramp 126, or both. Or, the front wall 116, the back wall 118, or both can be made shiftable from a generally vertical position to an angled position to form the front and back ramps 124, 126.

The shiftable walls 116, 118 are shown in a vertical position relative to the base 114. Within this position, the front wall 116 and back wall 118 include S-shaped folds 128 where the front and back walls 116, 118 meet the side walls 120, 122. These folds 128 are made of a flexible material and are pinned at the base 114 (pinning not shown). When a force is applied to the front wall 116 in a direction away from the back wall 118, the two S-shaped folds 128 adjacent to the front wall 116 will partially unfold creating the front ramp 124, as shown. Similarly, when a force is applied to the back wall 118 in a direction toward the front wall 116, the two S-shaped folds 128 adjacent to the back wall 118 will partially unfold creating the back ramp 126.

When both front and back walls 116, 118 are shifted to form ramps 124, 126, the side view of the cassette 113 appears like a parallelogram as did the carriage 10 shown in FIG. 5. The ability to shift can, like that ability within the carriage 10C shown in FIG. 6, unblock or loosen individuals photosensitive sheets 18.

Other folding methods and structures could also provide the shiftable front and back ramps 124, 126. For example, rather than pinning each S-shaped fold 128 at the base 114 to unfold properly, a similar fold (not shown) could be formed by cutting the bottom part of the fold away, then regathering and connecting the remaining fold. Then, when force is applied to the front and back walls 116, 118, as described, the front and back ramps 124, 126 are formed. In addition, the S-shaped folds 128 could be formed and located outside the walls 116, 118, 120, and 122, rather than inside as shown in FIG. 16.

While described as part of an imaging system, this invention can be applied to other systems. For example, the ramps can be used to facilitate the feeding of sheets of material other than photosensitive materials. In addition, other embodiments similar to those described above are contemplated by this invention. Furthermore, the processes of using the apparatus described above and other similar embodiments are apparent.

We claim:

1. A container for storing sheets of photosensitive material and enabling individual sheets to be transported from the container to an imaging unit by a feed mechanism of the imaging unit, wherein the container fits within an entry port of the imaging unit to provide a light-tight environment for the photosensitive material, and comprises:

a base upon which multiple sheets of photosensitive material may be placed;

a front wall which extends from the base to facilitate sliding transport of each sheet from the container into the imaging station, wherein the front wall is angularly shiftable relative to the base between a first position in which the front wall extends substantially perpendicular to the base and a second position in which the front wall extends upwardly and outwardly from the base to form a front ramp.

2. The container of claim 1, further comprising a back wall which extends upwardly from the base, wherein the back wall is angularly shiftable relative to the base between a first position in which the back wall extends substantially perpendicular to the base and a second position in which the back ramp extends upwardly from the base and substantially parallel to front wall when the front wall is in the second position.

3. A container for storing sheets of photosensitive material which can be transported from the container to an imaging unit by a feed mechanism of the imaging unit, wherein the container fits within an entry port of the imaging unit to provide a light-tight environment for the photosensitive material, and comprises:

a base on which a light-tight bag containing the photosensitive material is placed, the base having a first surface member which is stationary relative to the base; and a clamping member positioned and movable relative to the base, the clamping member having a second surface member which is stationary relative to the clamping member, the clamping member being movable between an open position and a closed position, clearance existing between the first and second surface members when the clamping member is in the open position which allows for insertion of a first end of the bag into the container and between the first and second surface members, the second surface member being adjacent the first surface member when the clamping member is in the closed position such that light is prevented from passing between the base and the clamping member, at least one of the first and second surface members being rounded to minimize friction between at least one of the first and second surface members and the bag when the first end of the bag is pulled from the base and clamping member such that the bag is removed from the container and from around the photosensitive material.

4. A container for storing sheets of photosensitive material which can be transported from the container to an imaging unit by a feed mechanism of the imaging unit, wherein the container fits within an entry port of the imaging unit to provide a light-tight environment for the photosensitive material, and comprises:

a base on which a light-tight bag containing the photosensitive material is placed, the base having a first surface member which is stationary relative to the base and integral to the base; and a clamping member positioned and movable relative to the base, the clamping member having a second surface member which is stationary relative to the clamping member and integral to the clamping member, the clamping member being movable between an open position and a closed position, clearance existing between the first and second surface members when the clamping member is in the open position which allows for insertion of a first end of the bag into the container and between the first and second surface members, the second surface member being adjacent the first surface member when the clamping member is in the closed position such that light is prevented from passing between the base and the clamping member.

5. A container for storing sheets of photosensitive material which can be transported from the container to an imaging unit by a feed mechanism of the imaging unit, wherein the container fits within an entry port of the imaging unit to provide a light-tight environment for the photosensitive material, and comprises:

a base on which a light-tight bag containing the photosensitive material is placed, the base having a first surface member which is stationary relative to the base;

a clamping member positioned and movable relative to the base, the clamping member having a second surface member which is stationary relative to the clamping member, the clamping member being movable between an open position and a closed position, clearance exists between the first and second surface members when the clamping member is in the open position which allows for insertion of a first end of the bag into the container and between the base and clamping member, the second surface member being adjacent the first surface member when the clamping member is in the closed position such that light is prevented from passing between the base and the clamping member; and a film-saver mechanism which prevents the removal of the container from the imaging unit when the container contains at least one sheet of photosensitive material.

6. A container for storing sheets of photosensitive material which can be transported from the container to an imaging unit by a feed mechanism of the imaging unit, wherein the container fits within an entry port of the imaging unit to provide a light-tight environment for the photosensitive material, and comprises:

a base on which a light-tight bag containing the photosensitive material is placed, the base having a first surface member which is stationary relative to the base;

a clamping member positioned and movable relative to the base, the clamping member having a second surface member which is stationary relative to the clamping member, the clamping member being movable between an open position and a closed position, clearance exists between the first and second surface members when the clamping member is in the open position which allows for insertion of a first end of the bag into the container and between the base and clamping member, the second surface member being adjacent the first surface member when the clamping member is in the closed position such that light is prevented from passing between the base and the clamping member; and a lid that can be inserted between the photosensitive material within the container and the imaging unit to cover the photosensitive sheets and provide a light-tight container seal with the container preventing light from striking the photosensitive material when either the imaging unit is opened or the container is removed from the imaging unit.

7. The container of claim 6, the lid being generally rectangular.

8. A container for storing sheets of photosensitive material which can be transported from the container to an imaging unit, wherein the container fits within an entry port of the imaging unit to provide a light-tight environment for the photosensitive material, and comprises:

a base on which a bag containing the sheets of photosensitive material is placed, the bag having a first bag portion; and non-rotating, light-blocking members between which the first bag portion is positioned when the bag containing the sheets of photosensitive film is positioned on the base and prepared for removal from the sheets, the light-blocking members being positioned to prevent light from passing between the light-blocking members and striking the photosensitive material when the bag is removed from the sheets of photoreceptive material, at least one of the light-blocking members being rounded to minimize friction between the bag and the at least one rounded light-blocking member when the first bag portion is pulled out from between the light-blocking members such that the bag is removed from the container.

9. The container of claim 8, the light-blocking members comprising three light-blocking members.

10. The container of claim 8, at least one of the light-blocking members being moveable relative to the base.

11. A container for storing sheets of photosensitive material which can be transported from the container to an imaging unit, wherein the container fits within an entry port of the imaging unit to provide a light-tight environment for the photosensitive material, and comprises:

a surface on which the sheets of photosensitive material rest when the sheets are stored within the container; and means for preventing removal of the container from the imaging unit when the removal preventing means determines that the removal would cause a sheet of photosensitive material to be outside a light-tight environment.

12. The container of claim 11, the removal preventing means preventing the removal of the container when at least one sheet of the photosensitive material is in the container.

13. The container of claim 11, the removal preventing means preventing the removal of the container when the container is not made light-tight before the removal of the container from the imaging unit is attempted.

14. The container of claim 11, the removal preventing means comprising a locking hole which is configured to engage a moveable locking member within the imaging unit when the container is inserted into the imaging unit.

15. The container of claim 14, the removal preventing means further comprising a locking sensor which can sense the presence of a sheet of photosensitive material within the container.

16. The container of claim 14, the removal preventing means further comprising a locking sensor which can sense the presence of a lid covering the container.

17. The container of claim 11, wherein the sheet of photosensitive material which would be outside the light-tight environment is not intended to be outside the light-tight environment.

18. A container for storing sheets of photosensitive material which can be transported from the container to an imaging unit, wherein the container fits within an entry port of the imaging unit to provide a light-tight environment for the photosensitive material, and comprises:

a base on which a bag containing the sheets of photosensitive material is placed, the bag having a first bag portion; and at least three light-blocking members between which the first bag portion is positioned when the bag containing the sheets of photosensitive film is positioned on the base and prepared for removal from the sheets, the light-blocking members being positioned to prevent light from passing between the light-blocking members and striking the photosensitive material when the bag is removed from the sheets of photoreceptive material, at least one of the light-blocking members being rounded to minimize friction between the bag and the at least one rounded light-blocking member when the first bag portion is pulled out from between the light-blocking members such that the bag is removed from the container.

19. A container for storing sheets of photosensitive material which can be transported from the container to an imaging unit, wherein the container fits within an entry port of the imaging unit to provide a light-tight environment for the photosensitive material, and comprises:

a surface on which the sheets of photosensitive material rest when the sheets are stored within the container; and means for preventing removal of the container from the imaging unit when the removal would result in at least one of the sheets of photosensitive material being exposed to light from outside the imaging unit, the removal preventing means comprising a locking sensor which can sense the absence or presence of a sheet of photosensitive material within the container.

20. The container of claim 19, wherein the removal preventing means prevents the removal of the container when the locking sensor senses the presence of a sheet or until the locking sensor senses the absence of a sheet.

21. A container for storing sheets of photosensitive material which can be transported from the container to an imaging unit, wherein the container fits within an entry port of the imaging unit to provide a light-tight environment for the photosensitive material, and comprises:

a surface on which the sheets of photosensitive material rest when the sheets are stored within the container; and means for preventing removal of the container from the imaging unit when the removal would result in at least one of the sheets of photosensitive material being exposed to light from outside the imaging unit, the removal preventing means comprising a locking sensor which can sense the presence or absence of a lid covering the container.

22. The container of claim 21, wherein the removal preventing means allows the removal of the container from the imaging unit when the locking sensor senses the presence of the lid or until the locking sensor senses the absence of a sheet of photosensitive material.

23. The container of claim 21, further comprising a second locking sensor which can sense the presence or absence of a sheet of photosensitive material within the container, wherein the removal preventing means prevents the removal of the container from the imaging unit either when the locking sensor senses the absence of the lid or until the locking sensor senses the presence of the lid, and wherein the preventing means prevents the removal of the container from the imaging unit when the second locking sensor senses the presence of a sheet or until the second locking sensor senses the absence of a sheet.

\* \* \* \* \*